(12) United States Patent
Venkataraman

(10) Patent No.: US 6,785,845 B2
(45) Date of Patent: Aug. 31, 2004

(54) POS TERMINAL TEST SYSTEM AND METHOD

(75) Inventor: Kartik Venkataraman, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 599 days.

(21) Appl. No.: 09/832,736

(22) Filed: Apr. 10, 2001

(65) Prior Publication Data

US 2002/0178400 A1 Nov. 28, 2002

(51) Int. Cl.[7] .............................................. G06F 11/00
(52) U.S. Cl. ........................... 714/27; 705/16; 235/437
(58) Field of Search .............................. 714/25, 27, 37, 714/38, 40; 705/16; 235/436, 437

(56) References Cited

U.S. PATENT DOCUMENTS

| | | | | |
|---|---|---|---|---|
| 5,051,899 A | * | 9/1991 | Ikoma et al. ................... | 705/21 |
| 5,805,798 A | * | 9/1998 | Kearns et al. .................. | 714/48 |
| 6,009,538 A | * | 12/1999 | Goodwin, III et al. ......... | 714/25 |
| 6,021,395 A | * | 2/2000 | Goodwin, III .................. | 705/20 |
| 6,279,002 B1 | * | 8/2001 | Lenz et al. ..................... | 707/10 |
| 6,363,359 B1 | * | 3/2002 | Gronemeyer et al. .......... | 705/28 |
| 6,430,704 B1 | * | 8/2002 | Goodwin, III et al. ......... | 714/25 |
| 6,446,046 B1 | * | 9/2002 | Gronemeyer et al. .......... | 705/28 |
| 6,553,515 B1 | * | 4/2003 | Gross et al. .................... | 714/47 |
| 6,665,821 B1 | * | 12/2003 | Miyayama et al. ............. | 714/45 |
| 2002/0046363 A1 | * | 4/2002 | Nelson et al. .................. | 714/31 |

FOREIGN PATENT DOCUMENTS

EP    0 275 086    * 7/1988    ............ H04L/11/16

* cited by examiner

Primary Examiner—Nadeem Iqbal
Assistant Examiner—Tim M. Bonura

(57) ABSTRACT

A system for testing an application running on a point-of-sale (POS) terminal comprises a host running on a personal computer connected to the POS terminal, and a target running on the POS terminal. The host sends simulated keystrokes, card swipes and the like to the target, which passes these to the application under test. The target can send information to the host regarding the POS terminal status, such as the screen display, so that the host can send the simulated keystrokes, etc., to the target on a need basis. The host can also receive other data and send instructions to the target, e.g. it can obtain available RAM space details, file details and system clock details, and can send instructions to restart the application.

18 Claims, 2 Drawing Sheets

POS TERMINAL TEST SYSTEM AND METHOD

FIELD OF THE INVENTION

The present invention relates to a system and method for the testing of applications run on a Point-of-Sale (POS) terminal.

BACKGROUND OF INVENTION

Point-of-sale terminals are EDC (Electronic Data Capture) terminals that a merchant uses at the time and place of a transaction to capture purchaser information from credit cards, debit cards, smart cards, and the like.

The terminals may be combined with cash registers, bar code readers, optical scanners and magnetic stripe readers, and may be on-line to a central computer for, for example, credit checking and inventory updating.

Examples of POS terminals include those supplied by Verifone as the TXO™ and Verix™ terminals.

Developers of applications for POS terminals need to test the applications prior to their commercial use in order to debug them, and to ensure that they work properly. To do this, various testing tools are available.

In one such testing tool, the developer connects a PC to a POS terminal through a RS232 serial port, and uses the PC to simulate key inputs and card swipes into the terminal.

The developer writes a script of POS terminal key sequences and card swipes which represent various test cases in a test plan, and these sequences are sent to the POS terminal, where the application under test executes them one after the other. As well as key sequences, the developer can add pauses of differing lengths into the scripts between key presses in order to allow the application under test time to deal with a current key stroke before the next key stroke is simulated.

Using such a test tool, the developer can run various automated test plans on the POS terminal to ensure that all possible key and swipe card inputs are dealt with properly.

Problems can, however, arise with such test tools. For example, even though a test script may include pauses between keystrokes, the supply of the key sequences to the POS terminal may still lose synchronisation with the operations of the POS terminal. This may occur for example due to a slow down in the operations of the POS terminal caused by an increase in the amount of work and volume of data which the POS terminal has to process.

An object of the present invention is to provide an improved system and method for the testing of applications for use in Point-of-Sale terminals.

SUMMARY OF INVENTION

According to a first aspect of the present invention, there is provided a system for the testing of an application run on a POS terminal, which comprises a host device for sending messages to the POS terminal in accordance with a user's test procedure, and a target component provided in the POS terminal, which receives and processes the messages from the host device and provides data from the messages to the application under test; wherein the target sends status information to the host to indicate the status of the POS terminal, and the host transfers the messages to the target in accordance with this status information.

Thus, the testing tool of the present invention consists of two parts, a host separate from the POS terminal, and a target within the POS terminal. The host may for example be provided under a Windows™ platform on a personal computer, whilst the target may be a software component found in the POS terminal alongside the application to be tested.

The provision of status information allows for example test key sequences sent from the host to remain in synchronisation with the application running on the POS terminal, as the host can send data to the POS terminal on a need basis in response to the status information provided by the target. The system thus contrasts with the above-mentioned prior art testing tool that pumps data directly into the application on the POS terminal without regard to its status, and attempts to account for synchronisation problems using pauses in the keystroke sequence scripts. In the prior art, the full control of the test was at the computer, and the terminal merely executed the commands sent from the computer without providing any status information to the computer.

In one preferred form, the status information sent by the target is information regarding the screen display of the POS terminal. The host can then time the sending of information to the target in accordance with the screen information. For example, the host may send a card swipe command to the POS terminal, and may then await the display of a screen requesting expiry date information before sending data to simulate the key strokes for this information.

The connection of the host to the POS terminal may take any suitable form, and is preferably a serial connection, such as through an RS232 cable.

The target processes the data sent from the host, and carries out the various requirements necessary for it to be input to the application under test.

Preferably, the host sends data and command messages to the target, and the target determines the type of message received from the host, and then passes data from the data messages to the POS terminal application, or provides information to the host in accordance with the command messages. For example, the target may write data from a host data message to a corresponding buffer of the POS terminal, such as a keyboard or magnetic card swipe buffer, and might provide information as to the file name of a POS terminal file in response to a filename request message.

When the POS terminal is based on an interrupt-driven architecture, the target may issue an interrupt signal after passing data to a buffer, when the POS terminal does not provide a hardware interrupt associated with the buffer, such as for a card swipe buffer.

The host may receive other information from the target. For example, when the POS terminal is based on an events-driven architecture (such as a Verix™ terminal as supplied by Verifone), all of the events occurring in the POS terminal may be sent to the host by the target. Thus, the target preferably monitors an events queue of the POS terminal, and sends information relating to the events popped from the events queue to the host terminal. This information may then be used by a tester to determine what might have gone wrong in a particular test through an inspection of the events followed by the application.

Further information which the host may receive includes: information as to available space in the RAM of the POS terminal; details of files on the POS terminal; and details of the POS terminal's system clock, e.g. time and date.

The host may also instruct the target means to take a particular action, such as to delete or rename a file, amend the system clock, or reboot and restart the application under test.

Indeed, with an events-based POS terminal, the present invention allows the simulation of any event, as the target is able to put the simulated event, sent from the host, into the events queue of the terminal, so that the event is executed by the application's event handler on getting the event from the queue.

Preferably, the POS terminal application is configured to include trace statements, which are put into the application for debugging purposes. Such a statement, when executed, prints a string passed to it as an argument in an output source (for example an output/debug window or a COM port). If the application under test includes such statements, then preferably the target passes these trace statements to the host device also.

In a preferred embodiment, each trace statement in the test application is provided with an additional parameter which the host uses to group it with other trace statements. The host may then group all of the trace elements of the same parameter in one window, so that application programmers can have a number of trace statements in their applications without cluttering up the output window on the host device.

The host may be highly configurable with respect to the POS terminals to which it communicates. Preferably, the host includes a look-up table of the input code information that is used by the POS terminal under test, such as key code information, and correlates this information with the tester's desired simulated input in order to output a suitable simulated code for sending to the target. This allows the system to be used with various POS terminals merely by using a different look-up table. The host may configure the terminal properties, e.g. the number of keys, key code values for each key, the key-pad layout, the terminal processor byte ordering and the like, at run time for each terminal to which it connects.

The target may be configured using a resource file downloadable from the host. Thus, the target may receive instructions on how to configure the communications port of the POS terminal for communicating with the host, e.g. the baud rate used, etc.

The host may provide an interactive interface for the user in the form of the display of e.g. a POS terminal keypad layout or the like. This allows the test engineer to visually and interactively test the POS application. During the test, the host may record the keystrokes and other actions taken, so as to provide record and playback macro support, whereby the test engineer can record the test actions through the interactive mode, and can play the same back again at a later time.

The host may also provide scripting, in which pre-scripted sequences of messages are sent to the terminal to automatically test the terminal. The scripting language used may support looping and branching to user-defined functions, and may take a similar form to C.

Viewed from a further aspect the present invention provides, a method for the testing of an application run on a POS terminal, the method comprising the steps of:
  connecting a host device to the POS terminal for interfacing with a user of the system, and transferring messages to the POS terminal in accordance with a test plan provided by the user;
  providing a target component in the POS terminal for receiving the messages from the host device and for providing data from the messages to the POS terminal application to be tested; and
  sending status information from the target to the host to indicate the status of the POS terminal, and sending messages from the host to the target in accordance with the status information to test the application.

BRIEF DESCRIPTION OF DRAWINGS

The invention will hereinafter be described in greater detail by reference to the attached drawings which show an example form of the invention. It is to be understood that the particularity of the drawings does not supersede the generality of the preceding description of the invention.

DETAILED DESCRIPTION

Figure 1:
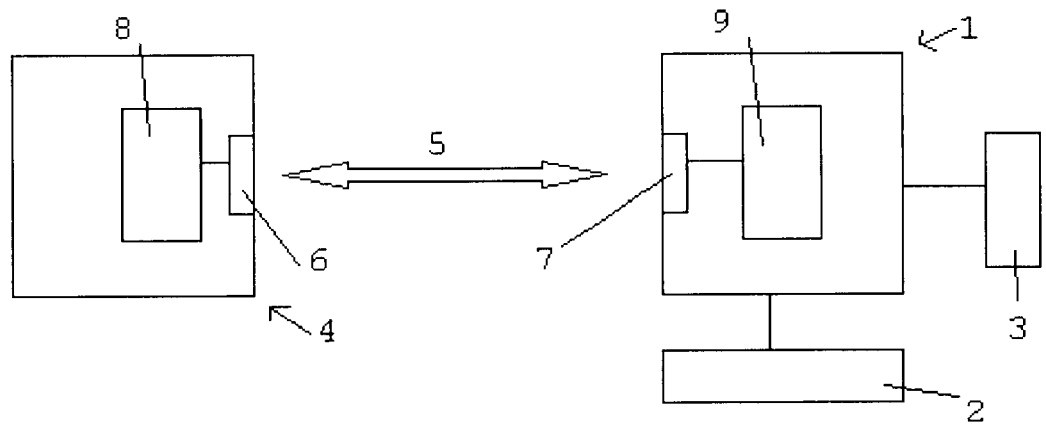
FIG. 1 is a schematic diagram of a system in accordance with an embodiment of the present invention.

FIG. 1 shows a system for testing a POS terminal 1, such as is used by merchants to capture purchaser details from credit cards or the like. The terminal 1 may for example have a keyboard 2 and a card swipe device 3 for normally inputting sales and purchaser information, and will run various applications to carry out the various functions necessary for this information capture, as well as for authorisations, stock control and the like.

Before such an application can run commercially on the POS terminal 1, it must be tested for bugs and to ensure that it works correctly.

In the present embodiment of the invention, this testing is carried out through a personal computer 4 connected to the POS terminal 1 via a serial link 5 over an RS232 cable connected between the communications ports 6 and 7 of the test computer and the POS terminal 1. The invention uses a host 8 provided on the test computer 4 and a target 9 provided on the POS terminal 1 which communicate and exchange data with one another.

The host and target may be provided as program code running on the test computer and POS terminal respectively.

The POS terminal to be tested could for example comprise a TXO™ terminal or Verix™ terminal, as manufactured by Verifone.

In testing an application running on the POS terminal 1, the host 8 will send simulated key strokes, card swipes, or the like to the target 9. The target 9 will supply this data to the application under test, and will also inform the host 8 of status information regarding the application under test. For example, the target 9 may provide information as to the screen display of the POS terminal 1.

The host 8 can then use this status information to correctly time the transmission of the simulated key strokes, etc., to the application via the target 9, and so can ensure that the keystroke data, etc., is supplied on a need basis and in synchronisation with the operation of the application under test.

Thus, for example, a script running on the host 8 will send out the various actions to be simulated on the terminal 1 at various intervals. For the host 8 to know when to send this information, it needs to know when the terminal 1 is expecting the next set of messages. For this, the target 9 sends out status messages whenever the terminal status changes (e.g. when the terminal passes from waiting for an account number to waiting for an expiry date, etc.). The host knows what the various states are that it should look out for, and, after the host sends account number details as a message to the target 9, it will wait for the target 9 to send out a message indicating that the application is waiting for an Expiry Date. When the host receives this message, it sends out the message containing the expiry date, and this is how the host is able to correctly time out the transmission of the simulated key strokes.

Besides providing screen information, the target 9 may supply other information that may be of use in determining how well the application is running. This information may be sent to the host 8 automatically or on request.

For example, where the POS terminal 1 uses events-based architecture, such as a Verix™ terminal, the target 9 may monitor the events queue of the POS terminal 1, and may pass information to the host 8 as to the events which have been popped off of the events queue. This may then provide the tester with information as to how the application is operating, and may give an insight into any problems that are occurring.

The host 8 sends messages to the target 9 that may contain data and/or requests. The target 9 then processes these messages, and takes appropriate action. For example, if the message contains data corresponding to a simulated keystroke or card swipe, then the target 9 will supply this data to the application under test, whilst if the data is a request to provide screen or file information or the like from the POS terminal 1, then the target 9 will obtain and supply this information to the host 8.

The messages may be given a simple format and transfer protocol, and for example need not include acknowledgements of receipt of information. The message format may include one or more flags to indicate the type of message (either data or command), and the type of data or command (e.g. a keystroke or a card swipe, or a file rename command or a reboot command). It may also include a data portion containing the keystroke or card swipe data, or command data such as the file name to be deleted.

A format for a set of host to target messages may comprise:

| Message | ID Field 1 | ID Field 2 | Data |
|---|---|---|---|
| Simulate Key | S | K | 1 or more bytes, each containing a terminal key value |
| Simulate Magnetic Card Swipes | S | M | Card Data |
| Reboot | C | R | No data sent |
| Get Date/Time | C | T | No data sent |
| Get File Size | F | Z | <file_name> |
| Rename File | F | R | <old_name><NULL><new_name> |
| Delete File | F | D | <file_name> |
| Change Clock Time | F | C | <new_time> |
| Get Config value | F | G | <config_variable> |
| Set Config value | F | S | <config_variable><NULL><new_value> |
| Get RAM details | C | M | No data sent |
| Get Dialog details | C | D | No data sent |
| Get Property | C | P | <PropertyID> |
| Com | C | C | <Communication_mode> |

Typical target to host messages may comprise:

| Message | ID Field 1 | ID Field 2 | Data |
|---|---|---|---|
| Events | E | <NULL> | <Event details> |
| Get Date/Time | C | T | <clock data> |
| Get File Size | F | Z | <file_size> |
| Get Config Value | F | G | <config_value> |
| Get Screen details | T | S | <screen data> sent as a TRACE message |
| Get RAM details | C | M | <RAM details> |
| Get Dialog details | C | D | <Dialog Details> |
| Get Property | C | P | <Property_Value> |
| Com | C | C | <Communication_mode> |
| Trace | T | <Window ID> | <Trace message> |

In the above tables, the "Config value" may be an application parameter such as a Terminal ID; the "Dialog details" may be the screen properties such as a Screen ID; the "Property" may be the value of an input variable displayed on the screen, such as "Amount entered"; and "com" may be the communication mode between the host and target, such as unidirectional communication or bi-directional communication.

The Trace message of the table relates to "trace" statements that can be put into the application under test for debugging purposes. Such a statement, when executed, prints a string passed to it as an argument to an output source (for example to an output/debug window or a COM port). This may be useful for debugging the terminal application or for getting additional application specific status information or for ensuring terminal application code-coverage at run-time.

If the application under test includes such statements, then the target may be configured to pass them to the host device also. It does this by routing these messages to the host along with other status messages.

In the present invention, each trace statement in the test application may be provided with an additional parameter <Window ID> which the host uses to group it with other trace statements. The host may then group all of the trace elements of the same parameter in one window, so that programmers of applications can have a number of trace statements in their applications without cluttering up the output window on the host device. Thus, trace elements with a parameter 'A' may all be output to one window on the display of the test computer 4, whilst trace statements having a parameter 'B' may be displayed in a second window.

The host 8 may provide an interactive interface with the user in the form of the display of a target keypad layout. This allows the test engineer to visually and interactively test the POS application. During the test, the host 8 may record the keystrokes and other actions taken, so as to provide record and playback macro support, whereby the test engineer can record the test actions through the interactive mode, and can play the same back again at a later time.

The host 8 may also provide scripting, in which pre-scripted sequences of messages are sent to the POS terminal 8 to automatically test the application. The scripting language used may support looping and branching to user-defined functions.

It will be appreciated that various designs for the host and target can be provided, and that a programmer, having the teachings of the present invention, will be able to implement them in a variety of manners.

In one possible implementation, the host may be configured as a multi-threaded Windows™ application, with the main thread running most of the program, and using child threads to control the communications port, playback and scripts.

Figure 2:
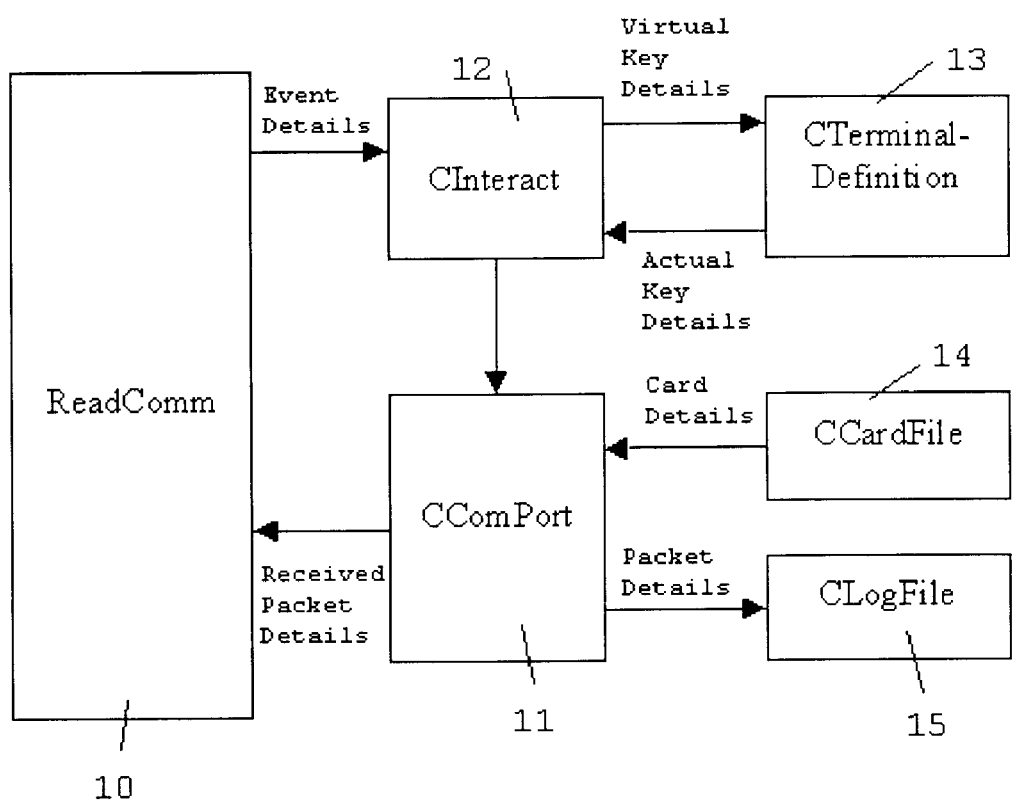
FIG. 2 is a schematic block diagram of the architecture of a host of FIG. 1.

An example of a possible host architecture is shown in FIG. 2, which discloses an Object-Oriented design that may be implemented in VC++5.0.

The communications port thread (Readcomm) 10 reads the messages from the target 9 through a "CComport" object 11 (that is responsible for opening, reading, writing and closing of the communications port 6 on the host 8) which it shares with the main thread, and passes the messages to the main thread through Windows™ Message Queue as a user-defined message. Readcomm 10 reads the communications port 6 in a loop until it is signalled by the main thread to terminate itself.

A "CInteract" class 12, shown in FIG. 2, is responsible for the interface between the computer and the user. It includes a "CTerminalDefinition" class 13 that is responsible for returning actual key-code for the POS terminal 1, and the CComport object 11.

The CTerminalDefinition class 13 holds the key-codes of the target POS terminal 1, and allows access to the actual key-codes defined for the target terminal 1, so that the key-codes produced by the user at the host 8 can be converted into the key-codes of the terminal 1. This thus allows various different terminals 1 to be supported.

A "CCardfile" class 14 allows the user to specify a magnetic card at run-time, and may have the option to decide upon which tracks of card data to send to the Target 9.

A "CLogFile" class 15 accepts details about a log file to be generated. The log file is a text file which stores all of the communication details as a log. The log can then be used for off-line tracking of all messages that were communicated between the host 8 and the target 9.

A playback thread reads prior recorded actions and executes them with the same timings. This thread is played when the user decides to play recorded scripts. The playback thread opens the recorded file and subsequently sends messages through the shared Ccomport object 11 to the target at intervals as recorded, and terminates itself when it reaches the end of a record.

A script thread is spawned by the main thread when the user runs a script file containing commands to be executed on the Host 8 or Target 9, and terminates itself when it reaches the end of the script file. It reads the scripted commands and executes them on the host 8 and/or target 9, and captures the results and sends them to the main thread for rendering into user-defined Windows™ messages.

Turning to the target 9, this may take different forms depending on whether the POS terminal 1 has an interrupt- or events-driven architecture, such as a TXO™ terminal or Verix™ terminal, respectively, as supplied by Verifone.

In an Interrupt-driven architecture, the main target code may comprise start, read, write and stop functions. The start function opens the communications port file, and loads the read function as the interrupt handler for reading and processing host messages at the communications port 7. The read function may call the write function whenever it wants to send a message to the host 8, and the stop function unloads the interrupt and closes the port 7.

When a host message simulating a key-stroke is received, the data part of the message is pulled out and written to the keyboard buffer. The application will then receive a keypress interrupt and read the key from the buffer. For a magnetic card swipe, the data is read to a MAG buffer of the terminal 1, and the read function handler then generates an interrupt, if the hardware does not generate one.

In event-driven architecture, the main functions are again start, read, write and stop. In this case, when the read function receives a simulated input message from the host, it posts a keyboard event or the like to the central event queue, and, as the application to be tested processes the events from the event queue, the application processes the simulated key-strokes, magnetic card swipes and the like.

If a POS terminal does not support interrupt routines, and there are no central event polling routines, then for every user action, such as a key press or card swipe, the target polls for a communications event and calls a read function if there is a communications event. This may be accomplished by overloading the terminal's operating system functions open, read, write and close. The target may maintain an internal keyboard buffer over the buffer of the operating system. Such a system may be applicable to the Verifone ACT2000™ support which is a Verifone non-events based library written to support TXO™ based applications running on Verix™ platforms.

A run-time resource file may be downloaded on to the POS terminal 1 for use by the target 9 to enable and configure the terminal 1, e.g. the communications port and baud rates, etc.

Figure 3:
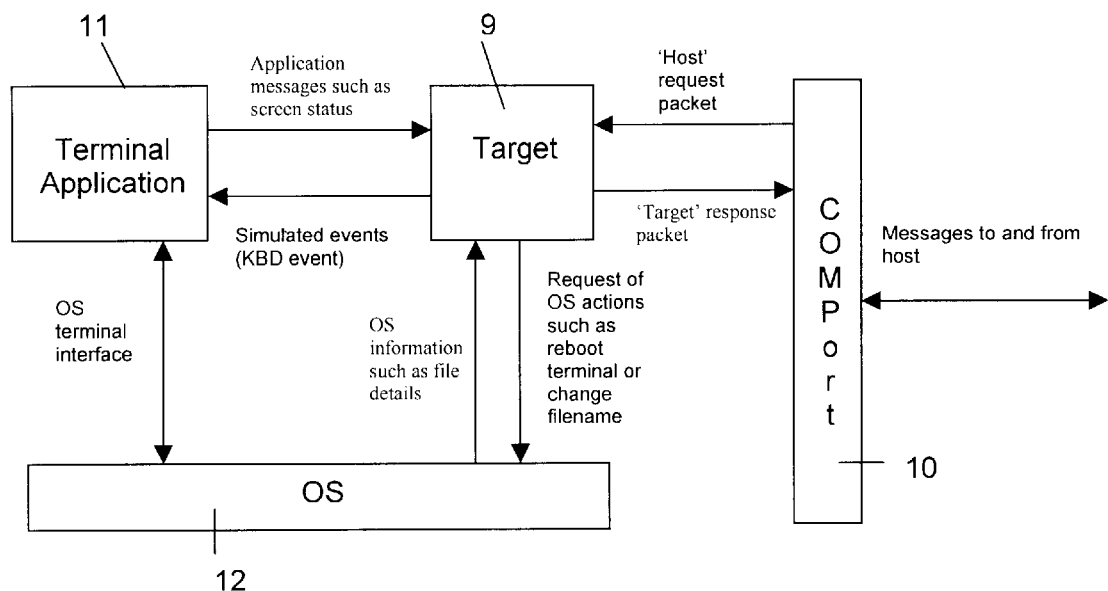
FIG. 3 is a block diagram of a possible POS terminal architecture including a target component.

FIG. 3 shows a block diagram of a possible terminal architecture.

As shown, the target 9 is the interface between the host 8 (communicating via the COM port driver 10 of the serial port 7 of the terminal 1) and the terminal application 11 which runs on the POS terminal together with the target 9. As needed, the target 9 fetches information for transfer to the host from the terminal application 11 or from the operating system 12 of the POS terminal.

In order to test the terminal application 11, the target 9 may send a simulated message from the host 5 either directly to the terminal application 11 or to the operating system 12. For example, in order to change the system clock time, the target 9 instructs the operating system 12 to change the terminal's date and time. On the other hand, to simulate a keyboard event, the target 9 may send the information directly to the event queue of the terminal application 11.

The terminal application 11 under test generally makes requests of the operating system 12 for all of its needs. However, to pass on status messages, such as trace messages, the terminal application relies on the target 9.

It is to be understood that various alterations additions and/or modifications may be made to the parts previously described without departing from the ambit of the invention.

What is claimed is:

1. A system for the testing of an application run on a POS terminal by simulating inputs into the POS terminal, said system comprising:

a host for interfacing with a user of the system, for connecting with a said POS terminal, and for transferring messages to said POS terminal, said messages including data for simulating inputs into the POS terminal; and a target provided in said POS terminal for receiving and processing said messages from said host, and for providing data from said messages to said application running on said POS terminal in order to simulate said inputs;

said target sending status information to said host to indicate the status of said POS terminal, and said host sending said messages to said target in accordance with said status information received from said target.

2. The system of claim 1, wherein said target sends information relating to the screen display of the POS terminal to said host.

3. The system of claim 1, wherein said host sends data and command messages to said target, and wherein said target includes a component for determining the type of message received from said host;

said target passing data from said data messages to said POS terminal application, and providing information to said host in accordance with said command information.

4. The system of claim 3, wherein said target writes data from a host data message to a corresponding buffer of said POS terminal.

5. The system of claim 4, wherein said POS terminal is based on an interrupt-driven architecture, and wherein said target issues an interrupt signal after passing said data to said buffer, when said POS terminal does not provide a hardware interrupt associated with said buffer.

6. The system of claim 1, wherein said POS terminal comprises an events-driven architecture, and wherein said target includes a component for monitoring an events queue of said POS terminal, and sends information relating to the events popped from said events queue to said host.

7. The system of claim 1, wherein said host includes a scripting component for allowing a user to compose, store and transmit script files of sequences of messages to said target.

8. The system of claim 7, wherein said scripting component allows for branching and looping of a script.

9. The system of claim 1, wherein said target includes a component for determining information as to the files located in the POS terminal, and for providing said file information to said host.

10. The system of claim 1, wherein said target includes a component for rebooting the test application on receiving a reboot instruction message from said host.

11. The system of claim 1, wherein said target includes a component for changing a system clock of said POS terminal in accordance with an instruction message from said host.

12. The system of claim 1, wherein said target includes a component for determining available RAM memory in the POS terminal in accordance with instructions from said host.

13. The system of claim 1, wherein said target includes a component for dumping trace signals of said application to said host.

14. The system of claim 1, wherein said host includes a recording component for displaying a terminal keyboard for interactive testing of said POS terminal application, and wherein said host includes a component for producing a log of the key sequences pressed in a said interactive test session.

15. The system of claim 1, wherein said host includes terminal definition files which provide terminal properties related to the terminal layout and keyboard codes, said files being configurable at run-time for each terminal tested.

16. The system of claim 1, wherein said target includes a resource file dowaloadable from said host, said resource file providing said target with configuration information.

17. A method for the testing of an application run on a POS terminal by simulating inputs into the POS terminal, said method comprising the steps of:

connecting a host to said POS terminal; said host including an interface for interfacing with a tester of the POS terminal, and a transfer component for transferring messages to said POS terminal, said messages including data for simulating inputs into the POS terminal in accordance with a test plan provided by the tester;

providing a target in said POS terminal for receiving said messages from said host and for providing data from said messages to said POS terminal application to be tested in order to simulate said inputs; and sending status information from said target to said host to indicate the status of said POS terminal, and sending messages from said host to said target in accordance with said status information to test said application.

18. A system for the testing of an application run on a POS terminal by simulating inputs into the POS terminal, said system comprising:

a host device connected to a said POS terminal, and including a software component for sending test messages to said POS terminal, said messages including data for simulating inputs into the POS terminal; and target software provided in said POS terminal for receiving and processing said messages from said host device, and for providing data from said messages to said application running on said POS terminal in order to simulate said inputs;

said target software including a software component for sending status information to said host device to indicate the status of said POS terminal, and said host device sending said messages to said target software in accordance with said status information.

* * * * *